United States Patent
Fong et al.

(10) Patent No.: US 9,264,979 B2
(45) Date of Patent: Feb. 16, 2016

(54) EXTENDED ACCESS BARRING

(75) Inventors: Mo-Han Fong, Sunnyvale, CA (US);
Puneet K. Jain, Hillsboro, OR (US);
Hyung-Nam Choi, Hamburg (DE)

(73) Assignee: INTEL CORPORATION, Santa Clara, CA (US)

( * ) Notice: Subject to any disclaimer, the term of this patent is extended or adjusted under 35 U.S.C. 154(b) by 20 days.

(21) Appl. No.: 13/994,117

(22) PCT Filed: Dec. 22, 2011

(86) PCT No.: PCT/US2011/066918
§ 371 (c)(1),
(2), (4) Date: Dec. 30, 2013

(87) PCT Pub. No.: WO2013/022474
PCT Pub. Date: Feb. 14, 2013

(65) Prior Publication Data
US 2014/0128029 A1    May 8, 2014

Related U.S. Application Data

(60) Provisional application No. 61/522,622, filed on Aug. 11, 2011.

(51) Int. Cl.
*H04W 48/12* (2009.01)
*H04W 48/10* (2009.01)
(Continued)

(52) U.S. Cl.
CPC .............. *H04W 48/10* (2013.01); *H04W 48/12* (2013.01); *H04W 72/0413* (2013.01); *H04W 88/02* (2013.01)

(58) Field of Classification Search
None
See application file for complete search history.

(56) References Cited

U.S. PATENT DOCUMENTS 8,780,810 B2 * 7/2014 Ryu et al. ............. 370/328
2013/0039309 A1 * 2/2013 Chiu ..................... 370/329
(Continued)

FOREIGN PATENT DOCUMENTS

WO    WO 2007/111009 A1    10/2007
WO    2008200146 A1    8/2008
(Continued)

OTHER PUBLICATIONS

International Search Report and Written Opinion received for PCT application No. PCT/US2011/066918, mailed on Aug. 31, 2012, 8 Pages.

(Continued)

*Primary Examiner* — Diane Mizrahi
(74) *Attorney, Agent, or Firm* — Thorpe North & Western LLP

(57) ABSTRACT

A system and method for authorizing access to a transmission station for a mobile device is disclosed. The mobile device can receive device extended access barring (EAB) configuration information in a broadcast control channel (BCCH) from a transmission station. The mobile device can bar the mobile device configured for EAB and having characteristics identified in the EAB configuration information for barring from accessing the transmission station. Alternatively, a system and method for barring a mobile device from accessing a transmission station is disclosed. The transmission station can receive from the mobile device a radio resource control (RRC) connection establishment request. The transmission station can configure a system information block (SIB) with extended access barring (EAB) configuration information. The transmission station can broadcast the SIB with EAB configuration information to the mobile device.

11 Claims, 15 Drawing Sheets

(51) Int. Cl.
*H04W 72/04* (2009.01)
*H04W 88/02* (2009.01)

(56) References Cited

U.S. PATENT DOCUMENTS

| | | | |
|---|---|---|---|
| 2013/0107778 A1* | 5/2013 | Ryu et al. | 370/311 |
| 2014/0036669 A1* | 2/2014 | Yang et al. | 370/230 |
| 2014/0099912 A1* | 4/2014 | Lee et al. | 455/404.1 |
| 2015/0079938 A1* | 3/2015 | Jung et al. | 455/411 |

FOREIGN PATENT DOCUMENTS

| | | |
|---|---|---|
| WO | 2010267405 A1 | 10/2010 |
| WO | 2013/022474 A1 | 2/2013 |

OTHER PUBLICATIONS

International Preliminary Report on Patentability with Written Opinion received for PCT Application No. PCT/US2011/066918, mailed on Feb. 20, 2014, 5 pages.

Office Action received for German Patent Application No. 11 2011 105 519.6, mailed on Apr. 3, 2014, 1 page of German Office Action.

3GPP TSG RAN WG2 R2-112804, "Extended Access Barring for RAN Overload Control", Discussion and Decision, May 2011, pp. 2, Meeting 74, Agenda 7.7, CATT, Spain.

3GPP TSG RAN WG2 R2-112865, "Discussion on Fast Method for Dynamic Access Control", Discussion, May 2011, pp. 4, Meeting 74, Agenda 4.3.1, ZTE, Spain.

3GPP TSG-RAN WG2 R2-112951, "Further Consideration on EAB", Discussion and Decision, May 2011, pp. 2, Meeting 74, Agenda 4.3.1, HiSillicon Huawei, Spain.

3GPP TSG RAN WG2 R2-113030, "Extended Access Barring for MTC Devices", Discussion and Decision, May 2011, pp. 3, Meeting 74, Agenda 4.3.1, Ericsson, Spain.

3GPP TSG RAN WG2 R2-113217, "EAB for RAN Overload Protection", Discussion and Decision, May 2011, pp. 4, Meeting 74, Agenda 4.3.1, Intel Corporation, Spain.

3GPP TSG RAN WG2 R2-113261, "Overview of Solutions on MTC", Discussion, May 2011, pp. 3, Meeting 74, Agenda 4.3.1, Samsung, Spain.

3GPP TSG RAN WG2 R2-113339, "Further Discussion on EAB", Discussion and Decision, May 2011, pp. 5, Meeting 74, Agenda 4.3.1, LG Electronics Inc, Spain.

European Search Report received for application 11870520.1, mailing date Jan. 1, 2015, 11 pages.

Japanese Office Action received for application 2014-525002, mailing date Jan. 13, 2015, 6 pages including English translation.

Korean Office Action received for application 201-7004489, mailing date Apr. 30, 2015, 9 pages including English translation.

* cited by examiner

```
-- ASN1START

SystemInformationBlockType1 ::=        SEQUENCE {
    ac-BarringInfo                         SEQUENCE {
        ac-BarringForEmergency                 BOOLEAN,
        ac-BarringForMO-Signalling             AC-BarringConfig        OPTIONAL,   -- Need OP
        ac-BarringForMO-Data                   AC-BarringConfig        OPTIONAL,   -- Need OP
    }                                                                  OPTIONAL,   -- Need OP
    radioResourceConfigCommon              RadioResourceConfigCommonSIB,
    ue-TimersAndConstants                  UE-TimersAndConstants,
    freqInfo                               SEQUENCE {
        ul-CarrierFreq                         ARFCN-ValueEUTRA        OPTIONAL,   -- Need OP
        ul-Bandwidth                           ENUMERATED {n6, n15, n25, n50, n75, n100}
                                                                       OPTIONAL,   -- Need OP
        additionalSpectrumEmission             AdditionalSpectrumEmission
    },
    mbsfn-SubframeConfigList               MBSFN-SubframeConfigList    OPTIONAL,   -- Need OR
    timeAlignmentTimerCommon               TimeAlignmentTimer,
    ...,
    lateNonCriticalExtension               OCTET STRING                OPTIONAL,   -- Need OP
    [[ ssac-BarringForMMTEL-Voice-r9       AC-BarringConfig            OPTIONAL,   -- Need OP
       ssac-BarringForMMTEL-Video-r9       AC-BarringConfig            OPTIONAL    -- Need OP
    ]],
    [[ ac-BarringForCSFB-r10               AC-BarringConfig            OPTIONAL    -- Need OP
    ]],
    [[ eab-BarringForMO-r11                EAB-BarringConfig           OPTIONAL    -- Need OP
    ]]
}

AC-BarringConfig ::=                   SEQUENCE {
    ac-BarringFactor                       ENUMERATED {
                                               p00, p05, p10, p15, p20, p25, p30, p40,
                                               p50, p60, p70, p75, p80, p85, p90, p95},
    ac-BarringTime                         ENUMERATED {s4, s8, s16, s32, s64, s128, s256, s512},
    ac-BarringForSpecialAC                 BIT STRING (SIZE(5))
}

EAB-BarringConfig ::=                  SEQUENCE {
    eab-BarringCategory                    BIT STRING (SIZE(3)),
    eab-BarringFactor                      ENUMERATED {
                                               p00, p05, p10, p15, p20, p25, p30, p40,
                                               p50, p60, p70, p75, p80, p85, p90, p95},
    eab-BarringTime                        ENUMERATED {s4, s8, s16, s32, s64, s128, s256, s512},
}

MBSFN-SubframeConfigList ::=           SEQUENCE (SIZE (1..maxMBSFN-Allocations)) OF MBSFN-SubframeConfig

-- ASN1STOP
```

FIG. 3

```
-- ASN1START

SystemInformationBlockType14 ::=       SEQUENCE {
    eab-BarringForMO-r11                   EAB-BarringConfig           OPTIONAL    -- Need OP
}

EAB-BarringConfig ::=                  SEQUENCE {
    eab-BarringCategory                    BIT STRING (SIZE(3)),
    eab-BarringFactor                      ENUMERATED {
                                               p00, p05, p10, p15, p20, p25, p30, p40,
                                               p50, p60, p70, p75, p80, p85, p90, p95},
    eab-BarringTime                        ENUMERATED {s4, s8, s16, s32, s64, s128, s256, s512},
}

-- ASN1STOP
```

FIG. 4

```
-- ASN1START

Paging ::=                    SEQUENCE {
    pagingRecordList              PagingRecordList              OPTIONAL,   -- Need ON
    systemInfoModification        ENUMERATED {true}             OPTIONAL,   -- Need ON
    etws-Indication               ENUMERATED {true}             OPTIONAL,   -- Need ON
    nonCriticalExtension          Paging-v890-IEs               OPTIONAL
}

Paging-v890-IEs ::=           SEQUENCE {
    lateNonCriticalExtension      OCTET STRING                  OPTIONAL,   -- Need OP
    nonCriticalExtension          Paging-v920-IEs               OPTIONAL
}

Paging-v920-IEs ::=           SEQUENCE {
    cmas-Indication-r9            ENUMERATED {true}             OPTIONAL,   -- Need ON
    nonCriticalExtension          Paging-v11-IEsSEQUENCE {}                 OPTIONAL
    -- Need OP
}

Paging-v11-IEs ::=            SEQUENCE {
    eab-Indication                ENUMERATED {true}             OPTIONAL,   -- Need ON
    nonCriticalExtension          SEQUENCE {}                   OPTIONAL    -- Need OP
}

PagingRecordList ::=          SEQUENCE (SIZE (1..maxPageRec)) OF PagingRecord

PagingRecord ::=              SEQUENCE {
    ue-Identity                   PagingUE-Identity,
    cn-Domain                     ENUMERATED  {ps, cs},
    ...
}

PagingUE-Identity ::=         CHOICE {
    s-TMSI                        S-TMSI,
    imsi                          IMSI,
    ...
}

IMSI ::=                      SEQUENCE (SIZE (6..21)) OF IMSI-Digit

IMSI-Digit ::=                INTEGER (0..9)

-- ASN1STOP
```

FIG. 7A

```
Paging-v11-IEs ::=            SEQUENCE {
    eab-Indication                BIT STRING (SIZE(3)),         OPTIONAL,   -- Need ON
    nonCriticalExtension          SEQUENCE {}                   OPTIONAL    -- Need OP
}
```

FIG. 7B

```
-- ASN1START

RRCConnectionRequest ::=            SEQUENCE {
    criticalExtensions                  CHOICE {
        rrcConnectionRequest-r8             RRCConnectionRequest-r8-IEs,
        criticalExtensionsFuture            SEQUENCE {}CHOICE {
            rrcConnectionRequest-r11            RRCConnectionRequest-r11-IEs,
            criticalExtensionsFuture-r11        SEQUENCE {}
        }
    }
}

RRCConnectionnRequest-r11-IEs ::=   SEQUENCE {
    rrcConnectionRequest-r8             RRCConnectionRequest-r8-IEs,
    eabConfiguration                    EABConfiguration        OPTIONAL,
    nonCriticalExtensions               SEQUENCE {}             OPTIONAL
}

RRCConnectionRequest-r8-IEs ::=     SEQUENCE {
    ue-Identity                         InitialUE-Identity,
    establishmentCause                  EstablishmentCause,
    spare                               BIT STRING (SIZE (1))
}

InitialUE-Identity ::=              CHOICE {
    s-TMSI                              S-TMSI,
    randomValue                         BIT STRING (SIZE (40))
}

EstablishmentCause ::=              ENUMERATED {
                                        emergency, highPriorityAccess, mt-Access, mo-Signalling,
                                        mo-Data, delayTolerantAccess-v1020, spare2, spare1}

EABConfiguration ::=                ENUMERATED {
                                        cat1, cat2, spare 3, spare2, spare 1}
}

-- ASN1STOP
```

FIG. 8

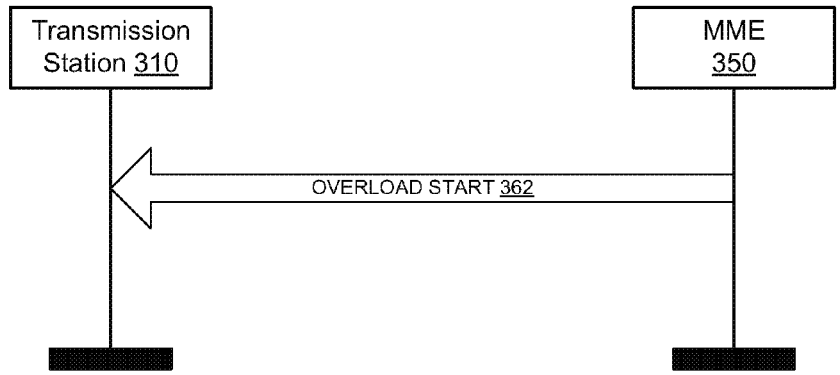

FIG. 9

```
-- ******************************************************
--
-- Information Element Definitions
--
-- ******************************************************

...
...
...

OverloadAction ::= ENUMERATED {
    reject-non-emergency-mo-dt,
    reject-rrc-or-signalling,
    permit-emergency-sessions-and-mobile-terminated-services-only,
    ...,
    permit-high-priority-sessions-and-mobile-terminated-services-only,
    reject-delay-tolerant-access,
    Reject-rrc-cr-for-UEs-configured-for-EAB,
    Reject-rrc-cr-for-UEs-configured-for-EAB-and-registered-neither-in-their-HPLMN-nor-in-equivalent-
    PLMN,
    Reject-rrc-cr-for-UEs-configured-for-EAB-and-registered-neither-in-the-preferred-PLMN-nor-in-their-
    HPLMN-nor-in-equivalent-PLMN
}

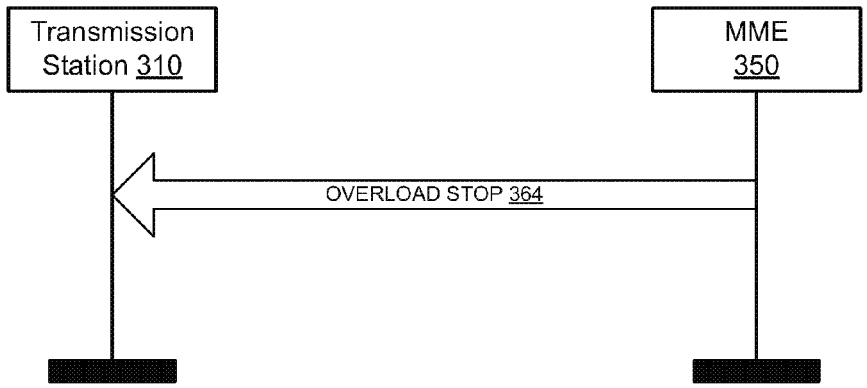

FIG. 11

```
-- **********************************************
--
-- Information Element Definitions
--
-- **********************************************

...
...
...

OverloadAction ::= ENUMERATED {
    reject-non-emergency-mo-dt,
    reject-rrc-cr-signalling,
    permit-emergency-sessions-and-mobile-terminated-services-only,
    ...,
    permit-high-priority-sessions-and-mobile-terminated-services-only,
    reject-delay-tolerant-access,
    apply-EAB-for-UEs-configured-for-EAB,
    Apply-EAB-for-UEs-configured-for-EAB-and-registered-neither-in-their-HPLMN-nor-in-equivalent-PLMN,
    Apply-EAB-for-UEs-configured-for-EAB-and-registered-neither-in-the-preferred-PLMN-nor-in-their-HPLMN-
    nor-in-equivalent-PLMN
}

```
OverloadExtensions RANAP-PROTOCOL-EXTENSION ::= {
-- Extension for Release 99 to enable the indication to the RNC which CN domain is suffering the
signalling traffic overload --
    { ID id-CN-DomainIndicator          CRITICALITY ignore  EXTENSION CN-DomainIndicator       PRESENCE
optional} |
-- Extension for Release 5 to enable NNSF --
    { ID id-GlobalCN-ID                 CRITICALITY ignore  EXTENSION GlobalCN-ID              PRESENCE
optional} |
-- Extension for Release 7 to indicate extended RNC-ID --
    { ID id-ExtendedRNC-ID              CRITICALITY reject  EXTENSION ExtendedRNC-ID           PRESENCE
optional} |
-- Extension for Release 10 to support Low Priority overload --
    { ID id-Priority-Class-Indicator    CRITICALITY ignore  EXTENSION Priority-Class-Indicator PRESENCE
optional},
-- Extension for Release 11 to support Extended Access Barring --
    { ID id-Extended-Access-Barring-Indicator   CRITICALITY ignore  EXTENSION Extended-Access-Barring-
Indicator   PRESENCE optional},

...
}

Extended-Access-Barring-Indicator ::= BIT STRING (SIZE(8))
```

FIG. 15

EXTENDED ACCESS BARRING

RELATED APPLICATIONS

This application is a 371 nationalization of PCT Patent Application No. PCT/US11/66918, filed Dec. 22, 2011, entitled "MACHINE-TO MACHINE COMMUNICATION DEVICE AND METHOD FOR PROVIDING ENHANCED ACCESS BARRING IN A WIRELESS NETWORK," which claims the benefit of and hereby incorporates by reference U.S. Provisional Patent Application Ser. No. 61/522,622, filed Aug. 11, 2011.

BACKGROUND

Wireless mobile communication technology uses various standards and protocols to transmit data between a transmission station and a wireless mobile device. Some wireless devices communicate using orthogonal frequency-division multiplexing (OFDM) combined with a desired digital modulation scheme via a physical layer. Standards and protocols that use OFDM include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP LTE the Evolved Universal Terrestrial Radio Access Network (E-UTRAN) include of transmission stations (also commonly denoted as evolved Node Bs, enhanced Node Bs, E-UTRAN NodeBs, eNodeBs, or eNBs), which communicates with the wireless mobile device, known as a user equipment (UE). A downlink (DL) transmission can be a communication from the transmission station (or eNodeB) to the wireless mobile device (or UE), and an uplink (UL) transmission can be a communication from the wireless mobile device to the transmission station. Furthermore, the transmission station can be connected to the Mobility Management Entity (MME) located in the core network by means of the S1 interface.

Another technology for mobile communication is a universal mobile telecommunications system (UMTS), which is a 3GPP mobile cellular technology for networks using code division multiple access (CDMA). In UMTS, the transmission station can be a combination of Node Bs (also commonly denoted as NodeBs or NBs) and radio network controllers (RNCs), which communicates with the wireless mobile device, known as the UE. UMTS can specify a network system, covering the UMTS terrestrial radio access network (UTRAN), a core network (including a mobile application part (MAP)), and an authentication of users via subscriber identity module (SIM) cards. The RNCs can be connected to the core network by means of the Iu interface.

Under certain circumstances, known as access barring, a transmission station can prevent or restrict mobile device users from making access attempts, which can include emergency call attempts, or responding to pages in specified areas of a public land mobile network (PLMN). Such situations can include states of emergency or failure of one or more co-located PLMNs. Access class barring (ACB) can be used to prevent mobile devices from making access attempts to the transmission station in LTE systems and UMTS.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 3 illustrates a diagram of a system information block (SIB) type 2 information element (IE) in a long term evolution (LTE) system including extended access barring (EAB) parameters in accordance with an example;

FIG. 4 illustrates a diagram of a dedicated system information block (SIB) information element (IE) for extended access barring (EAB) in a long term evolution (LTE) system including EAB parameters in accordance with an example;

FIG. 7A illustrates a diagram of a paging message including an extended access barring (EAB) indication in accordance with an example;

FIG. 7B illustrates a diagram of an extended access barring (EAB) indication in accordance with an example;

FIG. 8 illustrates a diagram of an RRC connection request message including a mobile device's extended access barring (EAB) configuration information in accordance with an example;

FIG. 9 illustrates a block diagram of an overload start process from a mobility management entity (MME) to a transmission station in a long term evolution (LTE) system in accordance with an example;

FIG. 10 illustrates a diagram of an information element (IE) definition for an overload action IE when a mobile device's extended access barring (EAB) configuration information is sent from the mobile station in accordance with an example;

FIG. 11 illustrates a block diagram of an overload stop process from a mobility management entity (MME) to a transmission station in a long term evolution (LTE) system in accordance with an example;

FIG. 12 illustrates a diagram of an information element (IE) definition for an overload action IE when a mobile device's extended access barring (EAB) configuration information is not sent from a mobile station in accordance with an example;

FIG. 15 illustrates a diagram of a radio access network application part (RANAP) protocol extension including an extended access barring (EAB) indicator in accordance with an example;

Figure 1:
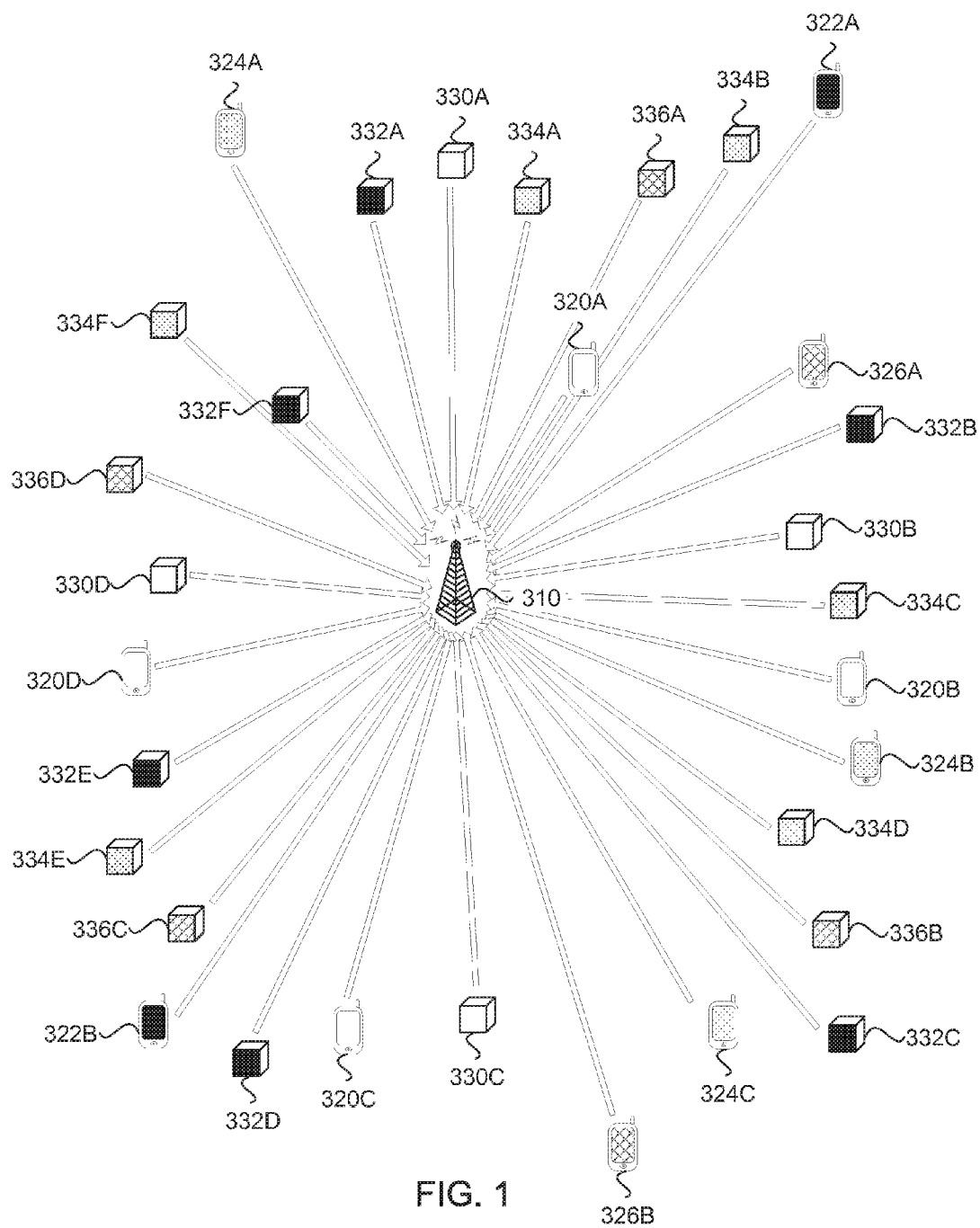
FIG. 1 illustrates a block diagram of a plurality of mobile devices transmitting a random access channel (RACH) to a transmission station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Access barring, such as access class barring (ACB) and extended access barring (EAB), allows a transmission station to broadcast messages which can prevent or restrict mobile device users from making access attempts at the transmission station. Broadcast messages can be available on a cell by cell basis indicating the class(es) or categories of subscribers barred from network access. Access barring allows a network operator to prevent overload of the radio access network and core network.

In an example, mobile devices can be members of one out of ten randomly allocated mobile populations, defined as access classes 0 to 9. A population number can be stored in a subscriber identity module or subscriber identification module (SIM) or universal subscriber identity module (USIM). In addition, mobile devices may be members of one or more special categories (e.g., access classes 11 to 15), also held in the SIM/USIM. The special categories can be allocated to specific high priority users. Class 15 can be allocated to public land mobile networks (PLMNs) staff, class 14 can be allocated to emergency services, class 13 can be allocated to public utilities (e.g., water/gas suppliers), class 12 can be allocated to security services, and class 11 can be allocated for PLMN use.

In ACB, if the mobile device is a member of at least one access class which corresponds to permitted classes as signaled over an air interface, and the access class is applicable in the serving network, access attempts may be allowed. Classes 0-9 can be allowed in home public land mobile networks (PLMNs) and visited PLMNs (VPLMNs). Classes 11 and 15 can be allowed in a home PLMN (HPLMN) if an equivalent home PLMN (EHPLMN) list is not present, or any EHPLMN. Classes 12, 13, or 14 can be allowed in the HPLMN and VPLMNs of a home country. A home country can be the country of the mobile country code (MCC) part of the international mobile subscriber identity (IMSI). Any number of these classes may be barred at any one time.

EAB can provide additional access barring over ACB. Extended access barring (EAB) can include a mechanism for the operator(s) (e.g., network operators) to control mobile originating access attempts from mobile devices configured for EAB in order to prevent overload of the access network and/or the core network. In congestion situations, the operator can restrict access from mobile devices configured for EAB while permitting access from other mobile devices. Mobile devices configured for EAB can be considered more tolerant to access restrictions than other mobile devices. The network can broadcast information to provide EAB control for mobile devices in a specific area when an operator or some automated process determines to apply EAB, such as an overload condition or other triggering event.

A large number of machine type communication (MTC) devices and/or machine-to-machine (M2M) devices may access a radio access network (RAN). As used herein, MTC and M2M may be used interchangeably. The MTC devices may overload the RAN and core network (CN) supporting the RAN. EAB can provide overload control and protection of a network, including the RAN and the CN, by allowing the network to bar the access of low priority and/or delay tolerant MTC devices when the network (e.g., the RAN or the core network) is overloaded. As used herein, delay tolerant and low priority may be used interchangeably.

A mobile device configured for EAB can be categorized based on the mobile device's roaming category (a mobile device's relationship to the PLMN, which supports a transmission station). The transmission station in the RAN of the PLMN can use a broadcast control channel (BCCH) to broadcast EAB information to mobiles devices. The EAB information on the BCCH can indicate which category of mobile devices configured with EAB can apply EAB. Mobile devices configured with EAB can check their categories (e.g., category A, B, or C, discussed below) in order to determine whether or not to apply EAB.

EAB can bar different types or categories of mobile devices than ACB, and/or EAB can provide different barring mechanisms than ACB. EAB may be configured for delay tolerant access mobile devices, such as MTC mobile devices, instead of all mobile devices in ACB. Mobile devices configured for EAB can be more tolerant to access restrictions (e.g., delay tolerant) than other mobile devices. EAB can be used to handle roamers, or mobile devices operating outside a HPLMN and/or EHPLMN. For a mobile device configured with EAB, EAB may take precedence over ACB.

Accessing barring information can be transmitted in the BCCH using a system information block (SIB). System information in LTE systems and UTMS can be separated into the master information block (MIB) and a number of SIBs. Each MIB and SIB can include a specified type of information. For example in LTE, the MIB can include physical layer information and SIB type 1 (SIB1) can include access restrictions and SIB scheduling information. Certain system information (e.g., MIB or SIB1) may be a prerequisite (i.e., read) to extract or read other system information or SIBs. Common and shared channel information in a SIB type 2 (SIB2) can be used in a random access procedure or a random access channel (RACH).

For cell search and selection in LTE systems the mobile device can read the physical broadcast channel (PBCH) in the physical layer and extracts the information from the MIB. The MIB can carry important system information, which can be submitted by the logical broadcast control channel (BCCH) in the radio link control layer via the broadcast channel (BCH) in the medium access control (MAC) layer mapped onto the PBCH. With the information from the MIB, the mobile device can be informed about the transmission bandwidth configuration in downlink of the cell. Other SIBs can provide system information sent via Physical Downlink Shared Channel (PDSCH).

ACB information can be broadcast via the SIB2. ACB parameters can be subjected to a SIB modification procedure and timing. A change of ACB parameters can change a SIB modification value, such as SIB systemInfoValueTag. Two modification periods (e.g., a SIB change notification period and SIB updated information period) may be used for a change to take effect. The modification period can take as long as 40.96 seconds (sec)=16*256 frames (e.g., modification period=modificationPeriodCoeff*defiultPagingCycle).

MTC devices can be numerous in a cell or the RAN. With MTC usage, a large number of MTC mobile devices can have bursty access to the transmission station, which can overload the transmission station and/or the network. In an example, the bursty access of the MTC devices can overload the transmission station and/or the network within one or two modification periods before the network can adapt to the overload. In an overload condition, the random access channel (RACH) may be overloaded, which may block access of a normal priority mobile device (non-delay tolerant access mobile device, non-low priority access mobile device, or high priority mobile device) for a substantial period of time. Normal priority mobile devices can have blocked access because other mobile devices' transmissions may interfere with the transmission station's reception of normal priority mobile devices' RACH, so the transmission station cannot decode the transmission.

FIG. 1 illustrates an example of a plurality of mobile devices 320A-D, 322A-B, 324A-C, 326A-B, 330A-D, 332A-F, 334A-F, and 336A-D in a cell transmitting a RACH to a transmission station 310 at a same time (or near the same time) generating a overload condition. The cell can be a logical definition generated by the transmitting station or geographic transmission area or sub-area covered by the transmitting station, which can include a specific cell identification (ID) that defines the parameters for the cell, such as control channels, reference signals, and component carriers (CC) frequencies. The mobile devices in the cell can include user devices 320A-D, 322A-B, 324A-C, and 326A-B and MTC or M2M devices 330A-D, 332A-F, 334A-F, and 336A-D. The mobile devices in the cell can include normal priority mobile devices (non-delay tolerant mobile devices) 320A-D and 330A-D and delay tolerant mobile devices 322A-B, 324A-C, 326A-B, 332A-F, 334A-F, and 336A-D. Although EAB can be well suited to MTC devices, EAB can be applied to other mobile devices (user devices) as well. Additionally, a MTC device can have normal priority access and may not be configured for EAB.

EAB can be used to limit the access of delay tolerant access devices, such as MTC mobile devices. Delay tolerant access can be access that is subject to EAB. EAB can be applied at the mobile device and/or transmission station and supported by the RAN and core network. EAB configuration information can be broadcasted via a channel, such as BCCH, from the transmission station and received by the mobile device. A system information block (SIB) can include the EAB configuration information. In an example, the EAB configuration information can be broadcast on an existing SIB, such as SIB type 2 (SIB2) in an LTE system or SIB type 3 (SIB3) in an UMTS. Alternatively, the EAB configuration information can be broadcast on a dedicated (or new) SIB for EAB, such as SIB type 14 (SIB14) in the LTE system or SIB type 21 (SIB21) in the UMTS. Although the dedicated SIB for EAB can include EAB configuration information, the dedicated SIB for EAB may also include information not related to EAB. For LTE systems, the number 14 is used for the dedicated SIB for EAB (SIB14) for clarity and simplicity of illustrations, but any number representing a dedicated SIB for EAB can be used. Similarly, for UTMS, the number 21 is used for the dedicated SIB for EAB (SIB21) for clarity and simplicity of illustrations, but any number representing a dedicated SIB for EAB can be used.

The mobile device can become aware of a presence or a change in the EAB configuration information broadcast by the transmission station in various procedures or methods. In an example, the mobile device can acquire up to date EAB configuration information periodically in a dedicated SIB or existing SIB. A dedicated SIB for EAB, such as SIB14 in LTE, may be updated more frequently than the modification period, allowing for a more dynamic modification of SIBs and EAB configuration information. In another example, the mobile device can acquire EAB configuration information in a SIB, such as the dedicated SIB for EAB, before attempting radio resource control (RRC) connection establishment for delay tolerant access. In another example, EAB configuration information can be included in a paging notification from the transmission station to the mobile device to indicate a presence of EAB configuration information. After the EAB configuration information is received, the mobile device can apply an access barring check process for EAB, which can also include processes for ACB.

The mobile device can convey or provide EAB configuration information, such as the mobile device's EAB category (EAB classification or roaming category), to the transmission station, including an eNB for the LTE system and an RNC for the UMTS, during the RRC connection establishment. In an example, the mobile device can indicate the mobile device's EAB configuration and roaming category in a RRC connection request message. In another example, the mobile device's EAB configuration can be implied by the RRC connection establishment cause request without indicating the mobile device's EAB configuration and/or roaming category in the RRC connection request message.

The LTE system can provide an access barring overload mechanism for EAB between the transmission station of the RAN and a mobility management entity (MME) of the core network (CN) via a S1 interface. In an example, the transmission station can receive EAB configuration information from the mobile device as part of RRC connection request message. When the transmission station receives an overload indication from the MME or when transmission station determines that the RAN is overloaded, the transmission station can configure a SIB with EAB configuration information and reject the RRC connection request from the mobile device. In another example, the transmission station may not receive EAB configuration information from the mobile device as part of RRC connection request message. When the transmission station receives an overload indication from the MME or when transmission station determines that the RAN is overloaded, the transmission station can configure a SIB with EAB configuration information without rejecting a RRC connection request from the mobile device.

The UMTS can provide an access barring overload mechanism for EAB between the transmission station, including the RNC, of the RAN and the core network (CN) via an Iu-PS interface. An existing priority class indicator may be used to define EAB. Alternatively, a dedicated (or new) EAB indicator can be used to define EAB.

Figure 2:
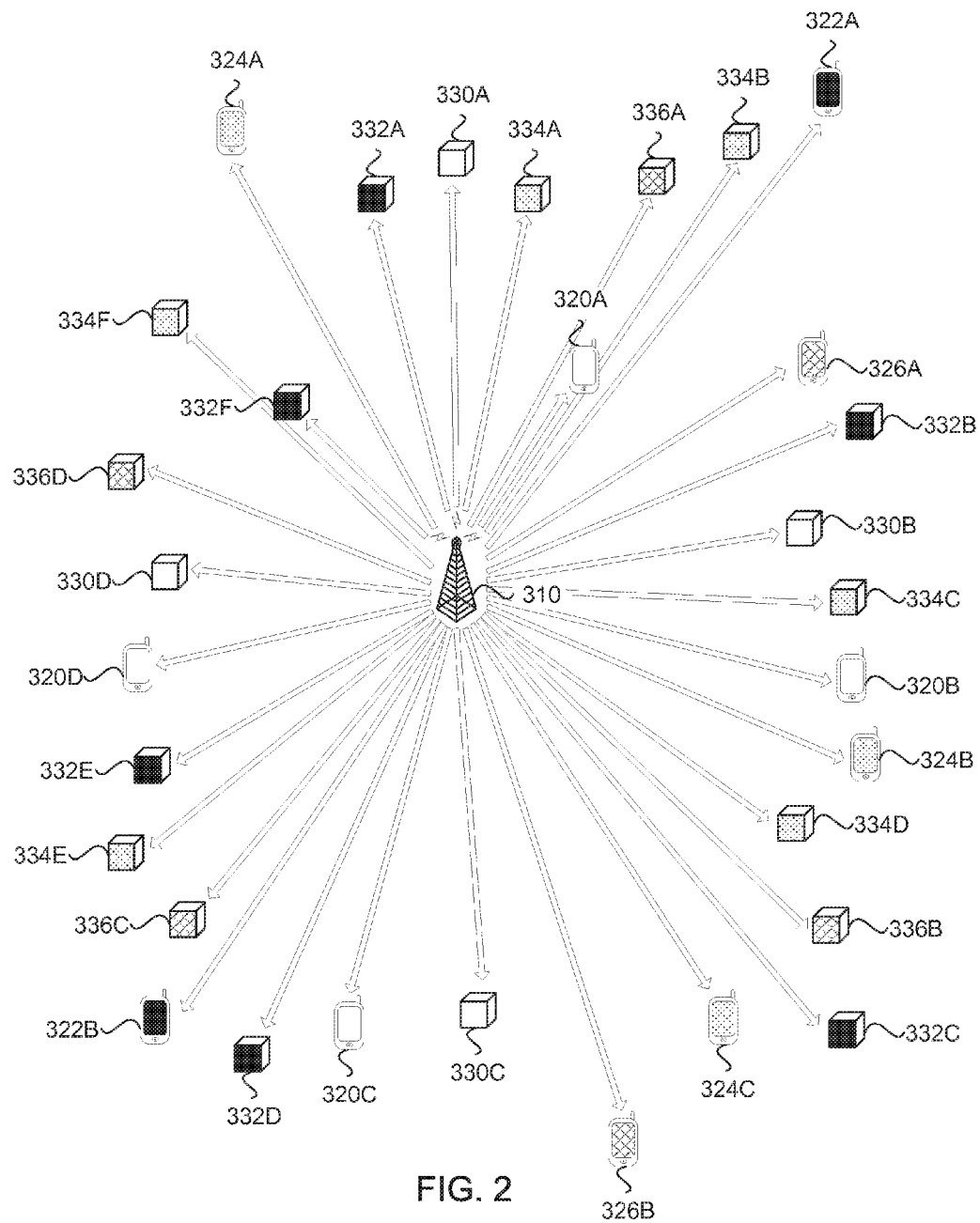
FIG. 2 illustrates a block diagram of a transmission station broadcasting broadcast control channel (BCCH) to a plurality of mobile devices in accordance with an example.

The following provides additional details of the examples. A transmission station can authorize a mobile device to access the transmission station using EAB. The mobile device can receive EAB configuration information in a BCCH from the transmission station. FIG. 2 illustrates an example of a transmission station 310 broadcasting the EAB configuration information in the BCCH to the plurality of mobile devices 320A-D, 322A-B, 324A-C, 326A-B, 330A-D, 332A-F, 334A-F, and 336A-D. Delay tolerant mobile devices (or mobile devices configured for EAB) 322A-B, 324A-C, 326A-B, 332A-F, 334A-F, and 336A-D can acquire the EAB configuration information from a SIB in the BCCH. SIBs can be used to convey system information in LTE systems and UMTS.

In an example, the EAB configuration information can be carried in an existing SIB, such as a SIB2 for an LTE system, along with ACB information. For LTE systems, ACB can be broadcast in the SIB2. SIB may be changed each modification period, so dynamic changes of EAB configuration information may not be supported when EAB configuration information is carried in an existing SIB, such as SIB2.

FIG. 3 illustrates a SIB2 IE (IE SystemInformationBlockType2) in a LTE system including EAB parameters (e.g., EAB configuration information). The IE SystemInformationBlockType2 can contain radio resource configuration information that can be common for mobiles devices in the cell. Mobile device timers and constants related to EAB functionality may be provided in an EAB field (e.g., an EAB mobile originating call indicator), such as an eab-BarringForMO-r11, as shown in SIB2 in FIG. 3.

The EAB configuration information can include a barring category, a barring factor, and/or a barring time. For example, SystemInformationBlockType2 field descriptions can include an eab-BarringCategory, an eab-BarringFactor, and/or an eab-BarringTime.

The barring category can also be referred to as a roaming category. In an eab-BarringCategory example, each bit can represent the category (or EAB category) of mobile devices (or UEs) where EAB is applied. The first bit or a leftmost bit (in FIG. 3) can indicate mobile devices that are configured for EAB (or category A). The second bit can indicate mobile devices that are configured for EAB and are neither in the mobile device's HPLMN nor in a PLMN equivalent to the mobile's device's HPLMN (EHPLMN) (or category B). The third bit can indicate mobile devices that are configured for EAB and are neither in the PLMN listed as most preferred PLMN of the country where the mobile's device is roaming in an operator-defined PLMN selector list on the SIM/USIM, nor in the mobile device's HPLMN nor in a PLMN that is equivalent to the mobile's device's HPLMN (or category C).

A public land mobile network (PLMN) can include a network established and operated by a regulatory body, an administration, or a recognized private operating agency (RPOA) for a specific purpose of providing land mobile communication services to the public. A relationship can exist between each subscriber and the subscriber's home PLMN (HPLMN). If communications are handled over another PLMN, the other PLMN can be referred to as a visited PLMN (VPLMN). A PLMN may provide service in one, or a combination, of frequency bands. A PLMN can be defined by borders of a country. More than one PLMN can exist in a country. The PLMN area can be the geographical area in which a PLMN provides communication services.

If eab-BarringForMO-r11 is included in the SIB IE, extended access barring may be applied for mobile originating calls from mobile devices configured for EAB.

The barring factor can include a value on which access to a transmission station by mobile device can be determined. For an eab-BarringFactor example, the mobile device may generate a random number. If the random number drawn by the mobile device is lower than the barring factor value, access to the transmission station may be allowed. Otherwise access to the transmission station can be barred. In another example, the values of the random number can be interpreted in the range [0,1] and the barring factor value can be a percentage, where p00 (0%)=0, p05 (5%)=0.05, p10 (10%)=0.10, . . . , p95 (95%)=0.95. For example, a p50 eab-BarringFactor indicates that approximately 50% of a category (A, B, or C) (as generated by each mobile device's random number generator) may be barred from accessing the transmission station. Although a percentage incremented by 5% is illustrated, any percentage increment can be used.

For an eab-BarringTime example, a mean EAB barring time value can be applied to the barring category. The mean EAB barring time value can use seconds or any other unit of time. For example, a value of s4 can indicate the mobile device for which EAB applies can be barred from accessing the transmission station for 4 seconds.

In another example, the EAB configuration information can be carried in a dedicated SIB for EAB, such as a SIB14 for an LTE system. The change of the EAB configuration information carried in the dedicated SIB for EAB may not be subjected to the modification period, which can be similar to SIB type 10 (SIB10), SIB type 11 (SIB11), or SIB type 12 (SIB12).

FIG. 4 illustrates a SIB14 IE (IE SystemInformationBlockType14) in a LTE system including EAB configuration information. The EAB configuration information in the dedicated SIB can include a barring category, a barring factor, and/or a barring time, which were previously described. The IE SystemInformationBlockType14 can include field descriptions similar to the SystemInformationBlockType2 field descriptions previously described.

The barring category used in the existing SIB or the dedicated SIB for EAB in LTE systems or UMTS can include a three-bit field or a two-bit field. In the examples illustrated in FIGS. 3-4, a three-bit bit mask is used to indicate which of the three categories (category A, B, or C) of mobile devices EAB is applied. In an example, the three categories can be mutually exclusive, where mobile devices in category A are not in category B or category C, and mobile devices in category B are not in category A or category C, and mobile devices in category C are not in category A or category B.

In another example, each subcategory can be a superset of another category. For example, category A can be a superset of category B and category B can be a superset of category C, which can mean EAB applicable to category A mobile devices can apply to categories B and C mobile devices. Stated another way, category C can be a subset of category B and category B can be a subset of category A, which can mean EAB applicable to category B mobile devices can apply to categories C mobile devices, but may not apply to category A mobile devices. In an alternative example, the barring category can use a two-bit field to indicate which set or EAB category (roaming category) of mobile device can apply the EAB. For example, '00' can correspond to category A mobile devices, '01' can correspond to category B mobile devices, and '10' can correspond to category C mobile devices.

Figure 5:
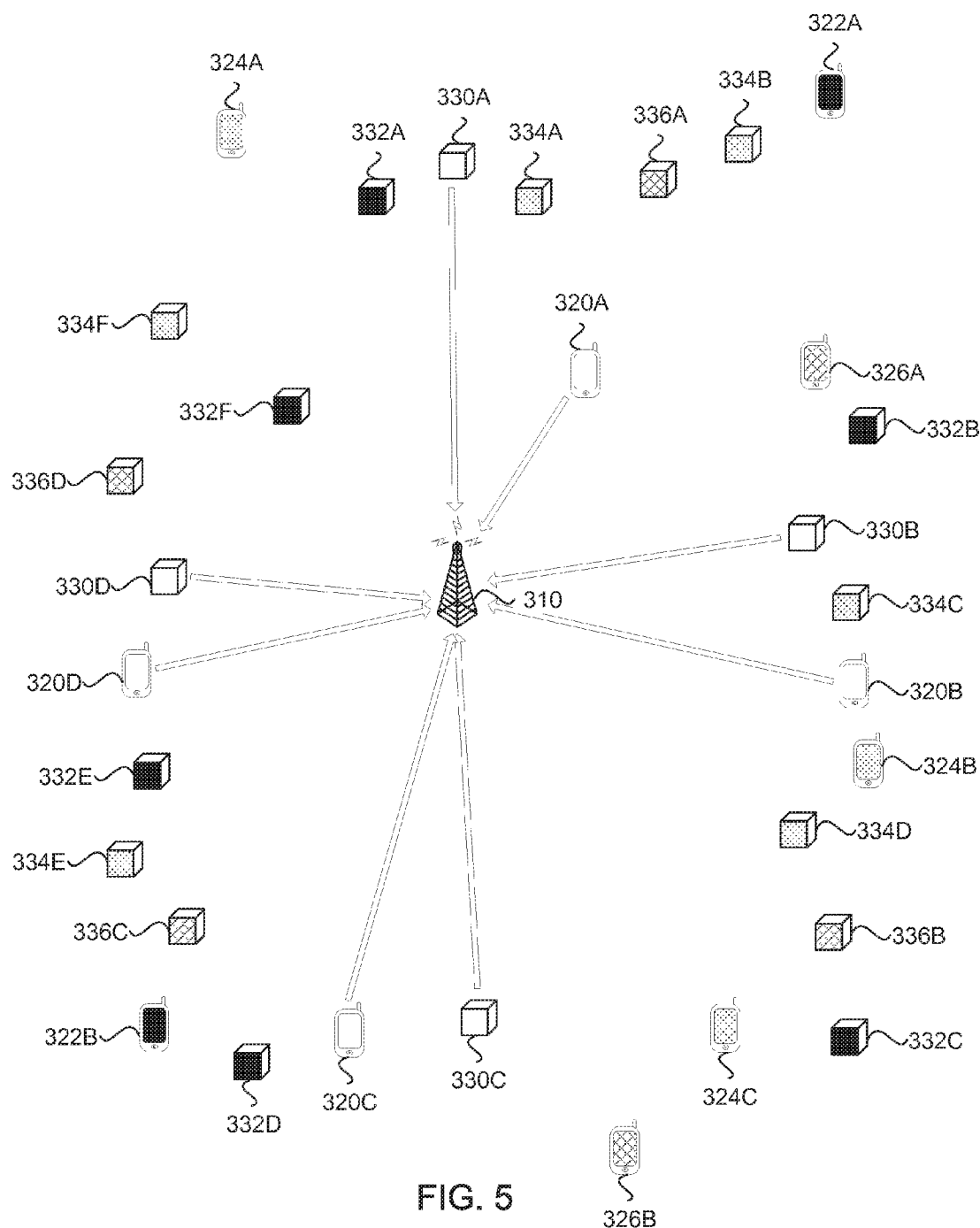
FIG. 5 illustrates a block diagram of a plurality of non-delay tolerant mobiles devices transmitting a random access channel (RACH) to a transmission station and EAB category A mobile devices barred from transmitting to the transmission station in accordance with an example.

FIG. 5 illustrates an example of EAB applied to category A mobile devices 322A-B, 324A-C, 326A-B, 332A-F, 334A-F, and 336A-D with a barring factor value of 100% allowing other mobile devices (or normal priority mobile devices) 320A-D and 330A-D in a cell to transmit a RACH to (and subsequently communicate with) the transmission station 310 without the category A mobile devices accessing the transmission station. In an example, the category A mobile devices can include 322A-B, 324A-C, 326A-B, 332A-F, 334A-F, and 336A-D. The category B mobile devices can include 322A-B, 326A-B, 332A-F, and 336A-D. The category C mobile devices can include 322A-B and 332A-F.

Figure 6:
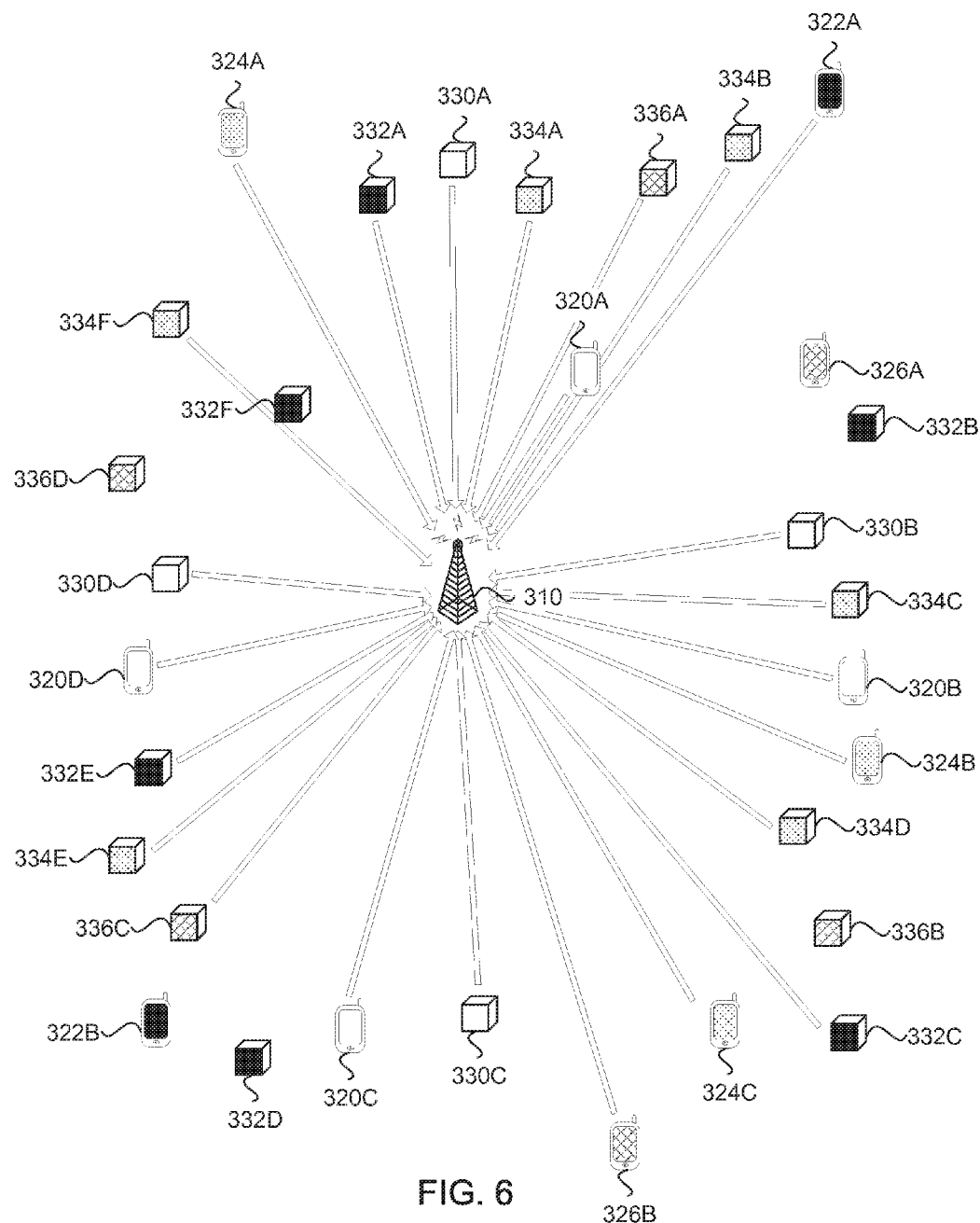
FIG. 6 illustrates a block diagram of a plurality of non-EAB category B mobiles devices transmitting a random access channel (RACH) to a transmission station and some EAB category B mobile devices barred from transmitting to the transmission station in accordance with an example.

FIG. 6 illustrates an example of EAB applied to category B mobile devices 322A-B, 326A-B, 332A-F, and 336A-D with a barring factor value of 50%. Category A mobile devices (excluding category B mobile devices) 324A-C and 334A-F and other mobile devices (or normal priority mobile devices) 320A-D and 330A-D can transmit to the transmission station 310. Fifty percent (50%) of the category B mobile devices 322B, 326A, 332B, 332D, 332F, 336B, and 336D can be barred allowing another 50% of the category B mobile devices 322A, 326B, 332A, 332C, 332E, 336A, and 336C to transmit to the transmission station.

In the specific examples shown previously, two parameters, such as barring factor (or eabBarringFactor) and barring time (or eabBarringTime), can be configured to control the percentage of mobile devices within a barring category that can be barred as well as the barring time. The barring factor can include a percentage of mobile devices in a barring category or a maximum number of access attempts of mobile devices in the barring category. In another example, an EAB parameter can be omitted, or other EAB parameters can be included, such as a 'maximum number of access attempt(s)', which can define the maximum number of times an access attempt can be barred. Another EAB parameter can be a 'maximum barring time', which can define the maximum amount of time an access attempt can be barred. Other EAB parameters can also be considered.

In an example, an eab-BarringForMO-r11 IE can be present if EAB is applied in the cell. When EAB is not applied to mobile device in the cell, the eab-BarringForMO-r11 IE may not be included in the existing SIB or dedicated SIB for EAB.

In an example for UMTS, the EAB configuration information can be carried in an existing SIB, such as a SIB3, similar to the existing SIB for the LTE system previously described. The EAB mobile originating call indicator (e.g., eab-BarringForMO-r11) can be carried in the existing SIB3. In another example for UMTS, the EAB configuration information can be carried in the dedicated SIB for EAB, such as a SIB21, similar to the dedicated SIB for EAB in the LTE system previously described. The dedicated SIB for EAB can carry the EAB mobile originating call indicator (e.g., eab-BarringForMO-r11).

The mobile device can become aware of a presence or a change in the EAB configuration information in the BCCH broadcast by the transmission station in various procedures or methods. In an example for the LTE system where the EAB mobile originating call indicator (e.g., eab-BarringForMO-r11) may be carried in the existing SIB, such as SIB2, the EAB configuration information may change in accordance with a modification period which can be up to 40.96 seconds. In examples for the LTE system where the EAB mobile originating call indicator (e.g., eab-BarringForMO-r11) may be carried in a dedicated SIB for EAB, such as SIB14, then more dynamic mechanisms to modify the EAB configuration can be applied. The dynamic mechanisms can be well suited to handle a sudden surge of MTC device access attempts or delay tolerant access attempts, such as an alarm or warning during emergency situation and the roaming of a large number of delay tolerant mobile devices from one network to another. The mobile device can acquire dynamically updated EAB information in a dedicated SIB for EAB, such as SIB14 for LTE systems and SIB 21 for UMTS.

The mobile device can acquire up to date EAB configuration information in the dedicated SIB for EAB periodically, and update the EAB configuration information periodically. As previously discussed, the transmission station can change the EAB configuration at anytime within a modification period by changing the content of the dedicated SIB for EAB. In order for the mobile device to acquire the latest EAB configuration information in an example, the mobile device can acquire a broadcast of a SIB having scheduling information, such as SIB type 1 (SIB1) for LTE system and a master information block (MIB) for UMTS, periodically, such as 80 milliseconds (ms) (e.g., 2 modification periods). The SIB having scheduling information can have scheduling information for the SIB with EAB configuration information (e.g., SIB2 or SIB 14 for LTE systems, or SIB3 or SIB21 for UMTS). If the SIB having scheduling information includes scheduling information for the SIB with EAB configuration information, the mobile device can proceed to acquire or receive the SIB with EAB configuration information accordingly.

In another example, the mobile device can acquire the SIB with EAB configuration information before attempting RRC connection establishment for delay tolerant access. As previously discussed, the transmission station can change the EAB configuration at anytime within a modification period by changing the content of the dedicated SIB for EAB. In order for the mobile station to acquire the latest EAB configuration information, in another example, a mobile device configured for EAB can acquire the SIB with EAB configuration information prior to performing RRC connection establishment for delay tolerant access. The mobile device can make a request from the transmission station for RRC connection establishment for delay tolerant access and update the EAB configuration information at the mobile station prior to the request. In an example, the mobile device can acquire the SIB having scheduling information, which can carry the scheduling information of the SIB with EAB configuration information. If the SIB with EAB configuration information is not included in the SIB carrying scheduling information, the mobile device can consider that EAB may not be applied. If the SIB with EAB configuration information is included in the SIB carrying scheduling information, the mobile device can proceed to acquire and receive the SIB with EAB configuration information and EAB configuration information contained in the SIB with EAB configuration information.

In another example, a paging notification from the transmission station can indicate a presence of EAB configuration information. The mobile device may acquire the SIB having scheduling information, then acquire the SIB with EAB configuration information before performing RRC connection establishment. The SIB with EAB configuration information (e.g., dedicated SIB for EAB) can be acquired in accordance with the paging notification where the transmission station can include an EAB indication in the paging message to indicate that EAB configuration information is present in the SIB with EAB configuration information, such as SIB14 for LTE systems. When the mobile device detects the EAB indication in the received paging message, the mobile device can proceed to receive and acquire the SIB having scheduling information for the scheduling information of the SIB with EAB configuration information and subsequently acquire the SIB with EAB configuration information.

FIG. 7A illustrates a paging message with the EAB indication. The EAB indication, such as an eab-Indication, can have a paging field description. The EAB indication present in the paging message can indicate EAB configuration information present in the SIB with EAB configuration information, such as dedicated SIB for EAB. In the example shown in FIG. 7A, the EAB indication indicates the presence of EAB configuration information in the SIB with EAB configuration information without distinguishing which categories of mobile devices (out of the categories A, B, and C, previously described) the EAB configuration information applies to. The EAB indication without distinguishing the categories of mobile devices can cause unnecessary reading (thus power consumption) of mobile devices who may not fall into the category where EAB is applied.

FIG. 7B illustrates an EAB indication with a bit mask distinguishing categories of mobile devices (category A, B, or C). The EAB indication in FIG. 7B can be similar to the barring category in the EAB configuration information. The EAB indication can include barring category information. The EAB indication, such as eab-Indication, can have a paging field description. Each bit can represent a category of mobile device (e.g., UE) where EAB configuration in the dedicated SIB is applied. The first bit or leftmost bit (in FIG. 7B) can indicate mobile devices that are configured for EAB (or category A). The second bit can indicate mobile devices that are configured for EAB and are neither in mobile device's HPLMN nor in a PLMN that is equivalent to the mobile's device's HPLMN (EHPLMN) (or category B). The third bit can indicate mobile devices that are configured for EAB and are neither in mobile device's PLMN listed as most preferred PLMN of the country where the mobile device is roaming in the operator-defined PLMN selector list on the SIM/USIM, nor in mobile device's HPLMN nor in a PLMN that is equivalent to the mobile's device's HPLMN (or category C). When a bit is set to '1', EAB may be applied using an access barring check process for the corresponding EAB category.

In another example, the EAB indication can use a two-bit field to indicate the category of mobile devices where EAB configuration in the SIB with EAB configuration information is applied. For example, '00' can correspond to category A mobile devices, '01' can correspond to category B mobile devices, and '10' corresponds to category C mobile devices.

In an UMTS example, the mobile device can acquire a MIB or a scheduling block (SB) which can carry the scheduling information of the SIB with EAB configuration information, such as SIB21. If the SIB with EAB configuration information is not included in the scheduling information, the mobile device can consider that EAB is not applied. If the SIB with EAB configuration information is included in the scheduling information, the mobile device can proceed to acquire the SIB with EAB configuration information and EAB configuration information contained in the SIB with EAB configuration information. In an another example, the SIB with EAB configuration information can be acquired in accordance with the paging notification where the transmission station can include an EAB indication in the paging message to indicate that EAB configuration information is present in the SIB with EAB configuration information, such as SIB21 for UMTS. When the mobile device detects the EAB indication in the received paging message, the mobile device can proceed to receive and acquire the SIB having scheduling information for the scheduling information of the SIB with EAB configuration information and subsequently acquire the SIB with EAB configuration information.

After the EAB configuration information is received, the mobile device can apply an access barring check process or procedure for EAB and ACB. A pseudo-code of an access barring check process at the mobile device configured for EAB for both EAB and ACB in the LTE system can include the following:

```
1>  if SystemInformationBlockType2 or SystemInformationBlockType14 includes
    "eab-BarringForMO-r11":
    2>  the UE can check whether EAB can be applied for 'low priority/delay tolerant' access
        attempts in accordance with "eab-BarringCategory"
    2>  if "eab-BarringCategory" does not bar the UE:
        3> the UE can apply an access barring check process for ACB.
    2>  else:
        3>if the UE has one or more Access Classes (AC), as stored on the USIM, with a value in
           the range 11..15, which is valid for the UE to use:
            4>  the UE can check whether the Access Classes are permitted by the network in
                accordance with the ac-BarringForSpecialAC contained in "AC barring
                parameter"
            4>  if at least one of the Access Classes is permitted by the network:
                5>  the UE can ignore any EAB information that is broadcast by the network.
            4>  else:
                5>  draw a random number 'rand' uniformly distributed in the range: 0 ≤rand < 1;
                5>  if 'rand' is lower than the value indicated by eab-BarringFactor included in
                    "eab-BarringForMO-r11":
                    6>  consider access to the cell as not barred;
                5>  else:
                    6>  consider access to the cell as barred;
                    6>  start timer "Tbarring" with the timer value calculated as follows, using the
                        eab-BarringTime   included in "eab-BarringForMO-r11":
                        "Tbarring" = (0.7+ 0.6 * rand) * eab-BarringTime.
        3>else:
            4>  draw a random number 'rand' uniformly distributed in the range:
                0 ≤rand < 1;
            4>  if 'rand' is lower than the value indicated by eab-BarringFactor included in "eab-
                BarringForMO-r11":
                5>  consider access to the cell as not barred;
            4>  else:
                5>  consider access to the cell as barred;
                5>  start timer "Tbarring" with the timer value calculated as follows, using the
                    eab-BarringTime included in "eab-BarringForMO-r11":
```

```
            "Tbarring" = (0.7+ 0.6 * rand) * eab-BarringTime.
1>   else:
     2>   the UE can apply an access barring check process for ACB.
```

The mobile device can bar the mobile device from accessing the transmission station when the mobile device has characteristics identified in the EAB configuration information for barring.

The mobile device can convey or provide EAB configuration information, such as the mobile device's EAB category (or EAB classification or roaming category), to the transmission station, including an eNB for the LTE system and an RNC for the UMTS, during the RRC connection establishment. The mobile device's EAB category can define the mobile device's relationship to a PLMN (category A, B, or C). When the mobile determines the access to a cell is not barred, the UE may send RRC connection request message to the transmission station of the RAN (e.g., the eNB for the LTE system or the RNC for the UMTS) to initiate a connection establishment. In an overload condition (e.g., when an overload indication is received from the core network (as discussed later) or when the RAN is overloaded), the RAN may reject the RRC connection request from the mobile device based on the EAB configuration information and/or roaming category of the mobile device. The roaming category (category A, B, or C) can be determined by the mobile device's relationship to a PLMN, such as whether the mobile device is in the mobile device's HPLMN. In order for the RAN to determine the EAB configuration information and/or roaming category of the mobile, in an example, the mobile device can provide the mobile device's EAB category or EAB configuration information in a RRC connection request message, or EAB configuration information can be implied by an RRC connection establishment cause.

FIG. 8 illustrates a RRC connection request message, such as an RRCConnectionRequest message, with the mobile device's EAB configuration information, which may include a roaming category (or EAB category). The RRCConnectionRequest message can be used to request the establishment of an RRC connection. The RRCConnectionRequest message can designate a signaling radio bearer (SRB), a logical channel, a radio link control-service access point (RLC-SAP), and a direction. The SRB can be defined as a radio bearer (RB) used for the transmission of RRC and non access stratum (NAS) messages. The SRB for the RRCConnectionRequest message can include SRB0, which can be used for RRC messages using the common control channel (CCCH) logical channel. The RLC-SAP can be configured to transparent mode (TM). The logical channel can be configured to the CCCH. The direction can be from the UE to the E-UTRAN.

The RRC connection request message, such as an RRCConnectionRequest message, can include an EAB classification included in an EAB configuration IE, such as an eabConfiguration IE, for the mobile device. The eabConfiguration IE can include the EAB classification. In an example as described in an RRCConnectionRequest field description, the eabConfiguration IE can be present when the UE is configured for EAB. Otherwise, the eabConfiguration IE can be omitted. A 'cat1' can indicate a UE that is in the UE's HPLMN or in a PLMN that is equivalent to the UE's HPLMN (EHPLMN). A 'cat2' can indicate the UE that is in the PLMN listed as most preferred PLMN of the country where the UE is roaming in the operator-defined PLMN selector list on the SIM/USIM.

The dedicated (or new) eabConfiguration IE can be provided in the RRC connection request message. In another example, the existing spare values (e.g., spare1 and spare2) in the existing establishmentCause IE can be used where spare1 may be replaced with cat1Access and spare2 can be replaced with cat2Access. The cat1Access and cat2Access can be similar to cat1 and cat2, as previously described with the eabConfiguration IE.

In another example, EAB configuration can be implied by the RRC connection establishment cause, such as establishmentCause IE. The establishmentCause (EstablishmentCause) can be enumerated as emergency, highPriorityAccess, mt-Access, mo-Signalling, mo-Data, delayTolerantAccess-v1020, spare2, spare1, where 'mt' stands for mobile terminating and 'mo' stands for mobile originating. When the mobile device initiates RRC connection establishment with cause 'delay tolerant access', such as delayTolerantAccess-v1020, as indicated in the RRC connection request message, the transmission station infers that the mobile devices can be configured for EAB (or the mobile device implies that mobile device can be configured for EAB). By implication, the establishmentCause IE can include the EAB classification.

The LTE system can provide an access barring overload mechanism for EAB between the transmission station of the RAN and a mobility management entity (MME) of the core network (CN) via a S1 interface. The MME can restrict the load that the transmission stations (e.g., eNodeBs) associated with the MME are generating on the MME, if the MME is configured to enable an overload restriction. The overload restriction can be configured by the MME invoking an S1 interface overload procedure to the transmission station's with which the MME has S1 interface connections. To reflect the amount of the desired load reduction by the MME, the MME can adjust the proportion of the transmission stations which may be sent in a S1 interface OVERLOAD START message, and the content of the OVERLOAD START message.

The MME can request the transmission station to restrict the load from subcategories of mobile devices that the MME's connected transmission stations are generating on the MME. The subcategories or classifications can include mobile devices that reselect from other PLMNs (PLMN type) and mobile devices using low access priority (delay tolerant access) for the radio access. In an example, PLMN type barring can be used to protect a VPLMN from an overload caused by the failure of one (or more) other networks in that country and accesses made from roaming subscribers.

In a method for barring a mobile device from accessing a transmission station, the transmission station can receive the mobile device's EAB configuration information from the mobile device as part of the RRC connection request message, as previously described. The transmission station can enable EAB on SIB (or configure a SIB with EAB configuration information). The transmission station can broadcast the SIB with the EAB configuration information to the mobile device. The transmission station can also reject the RRC connection request from the mobile device (via RRC connection reject message), when the transmission station receives overload indication from the MME or when the transmission station determines that the RAN is overloaded. The transmission station can receive the overload start message from the MME in the core network prior to configuring the SIB with EAB configuration information.

In another example, the transmission station can determine an overload condition prior to configuring the SIB with EAB configuration information. The transmission station can send the mobile device a RRC connection establishment rejection message for the mobile device having the EAB classification defined for EAB in the EAB configuration information for the transmission station. In an example, the EAB configuration information can be inferred from the RRC connection establishment cause, as previously described. If the cause is set to 'delay tolerant access', the mobile device can be configured for EAB. In an example, the EAB configuration information can also be inferred from the RRC connection establishment cause, where cause value can be explicitly set to 'EAB'.

FIG. 9 illustrates an OVERLOAD START 362 process from a MME 350 to a transmission station 310 in a LTE system. The overload start process can inform transmission station to reduce the signaling load towards the concerned MME. The overload start process (and overload stop process) can use non-transmission associated signaling, such as S1 signaling. The transmission station receiving the OVERLOAD START message can assume the MME is an overloaded state.

In an example, if an Overload Action IE in an Overload Response IE within the OVERLOAD START message is set to
  "reject RRC connection establishments for non-emergency mobile originated data transfer" (i.e., reject traffic corresponding to RRC cause "mo-data" and "delayTolerantAccess"), or
  "reject RRC connection establishments for signaling" (i.e., reject traffic corresponding to RRC cause "mo-data", "mo-signalling" and "delayTolerantAccess"), or
  "permit RRC connection establishments for emergency sessions and mobile terminated services" (i.e., permit traffic corresponding to RRC cause "emergency" and "mt-Access"), or
  "permit RRC connection establishments for high priority sessions and mobile terminated services" (i.e., permit traffic corresponding to RRC cause "highPriorityAccess" and "mt-Access"), or
  "reject RRC connection establishment for delay tolerant access" (i.e., eject traffic corresponding to RRC cause "delayTolerantAccess")", or
  "reject RRC connection establishment for UEs configured for EAB", or
  "reject RRC connection establishment for UEs configured for EAB and registered neither in their HPLMN nor in a PLMN that is equivalent to it, or
  "reject RRC connection establishment for UEs configured for EAB and registered neither in the PLMN listed as most preferred PLMN of the country where the UE is roaming in the operator-defined PLMN selector list on the SIM/USIM, nor in their HPLMN nor in an PLMN that is equivalent to it".
The transmission station (e.g., eNB) can:
  if a Traffic Load Reduction Indication IE is included in the OVERLOAD START message and if supported, reduce the signaling traffic indicated as to be rejected by an indicated percentage,
    otherwise ensure that the signaling traffic not indicated as to be rejected can be sent to the MME.
When the Overload Action IE is set to "Reject RRC connection establishment for UEs configured for EAB . . . " for various sub categories of UEs, eNB can apply EAB by enabling EAB on system information broadcast for EAB categories (category A, B, or C) of the UEs and the eNB can send a RRC connection rejection.

The Overload Action IE can indicate which signaling traffic is subject to rejection by the transmission station (e.g., eNB) in an MME overload situation. The Overload Action IE can have an IE/group name (Overload Action), a presence, a range, an IE type and reference, and a semantics description. The presence for the Overload Action IE can include mandatory (M). The IE type and reference for the Overload Action IE can include enumerated (Reject RRC connection establishments for non-emergency MO DT, Reject RRC connection establishments for Signaling, Permit Emergency Sessions and mobile terminated services only, . . . , Permit High Priority Sessions and mobile terminated services only, Reject delay tolerant access, Reject RRC connection establishment for UEs configured for EAB, Reject RRC connection establishment for UEs configured for EAB and registered neither in their HPLMN nor in a PLMN that is equivalent to it, Reject RRC connection establishment for UEs configured for EAB and registered neither in the PLMN listed as most preferred PLMN of the country where the UE is roaming in the operator-defined PLMN selector list on the SIM/USIM, nor in their HPLMN nor in an PLMN that is equivalent to it). FIG. 10 illustrates an IE definition for an overload action IE.

FIG. 11 illustrates an OVERLOAD STOP 364 process from a MME 350 to a transmission station 310 in a LTE system. The overload stop can be used to reduce or prevent a sudden surge of access attempts from delay tolerant mobile devices (e.g., MTC devices) when an EAB status changes from 'barred' to 'not barred'. The overload stop process can signal a transmission station in communication with the MME that the overload situation at the MME has ended and normal operation can resume. The transmission station receiving the OVERLOAD STOP message can assume that the overload situation at the MME has ended and the transmission station can resume normal operation toward the MME. If the GUMMEI List IE is present, the transmission station can, if supported, use the GUMMEI List IE information to identify which traffic to cease rejecting and/or to disable EAB for certain subcategories of UEs. If no particular overload action is ongoing for a particular GUMMEI value, the eNB can ignore the particular GUMMEI value.

In another example, the transmission station can receive an overload stop message from the MME in the core network. The transmission station can disable the SIB with EAB configuration information or remove the EAB configuration information from the SIB with EAB configuration information. The transmission station can broadcast the SIBs without EAB configuration information to the mobile device.

In a method for barring a mobile device from accessing a transmission station, the transmission station may not receive the mobile device's EAB configuration information as part of the RRC connection request message, as previously described. The transmission station can enable EAB on SIB (or configure a SIB with EAB configuration information). The transmission station can broadcast the SIB with the EAB configuration information to the mobile device. The transmission station may reject the RRC connection request from the mobile device, when the mobile device receives overload indication from the MME or when the transmission station determines that the RAN is overloaded. The transmission station can receive the overload start message from the MME in the core network prior to configuring the SIB with EAB configuration information. In an example, the EAB configuration information can be inferred from the RRC connection establishment cause, as previously described. If the cause is set to 'delay tolerant access', the mobile device can be configured for EAB. In an example, the EAB configuration information can also be inferred from the RRC connection establishment cause, where cause value can be explicitly set to 'EAB'.

FIG. 9 illustrates an OVERLOAD START process. In an example, if the Overload Action IE in the Overload Response IE within the OVERLOAD START message is set to "reject RRC connection establishments for non-emergency mobile originated data transfer" (i.e., reject traffic corresponding to RRC cause "mo-data" and "delayTolerantAccess"), or "reject RRC connection establishments for signaling" (i.e., reject traffic corresponding to RRC cause "mo-data", "mo-signalling" and "delayTolerantAccess"), or "permit RRC connection establishments for emergency sessions and mobile terminated services" (i.e., only permit traffic corresponding to RRC cause "emergency" and "mt-Access"), or "permit RRC connection establishments for high priority sessions and mobile terminated services" (i.e., only permit traffic corresponding to RRC cause "highPriorityAccess" and "mt-Access"), or "reject RRC connection establishment for delay tolerant access" (i.e., reject traffic corresponding to RRC cause "delayTolerantAccess")", or "Apply EAB for UEs configured for EAB", or "Apply EAB UEs configured for EAB and registered neither in their HPLMN nor in a PLMN that is equivalent to it, or "Apply EAB for UEs configured for EAB and registered neither in the PLMN listed as most preferred PLMN of the country where the UE is roaming in the operator-defined PLMN selector list on the SIM/USIM, nor in their HPLMN nor in an PLMN that is equivalent to it".

The transmission station (e.g., eNB) can:
if the Traffic Load Reduction Indication IE is included in the OVERLOAD START message and if supported, reduce the signaling traffic indicated as to be rejected by the indicated percentage,
otherwise ensure that the signaling traffic not indicated as to be rejected is sent to the MME.

When the Overload Action IE is set to "Apply EAB for UEs configured for EAB . . . " for various sub categories of UEs, eNB can apply EAB by enabling EAB on system information broadcast for EAB categories (category A, B, or C) of the UEs.

The IE type and reference for the Overload Action IE can be enumerated (Reject RRC connection establishments for non-emergency MO DT, Reject RRC connection establishments for Signaling, Permit Emergency Sessions and mobile terminated services only, . . . , Permit High Priority Sessions and mobile terminated services only, Reject delay tolerant access, Apply EAB for UEs configured for EAB, Apply EAB for UEs configured for EAB and registered neither in their HPLMN nor in a PLMN that is equivalent to it, Apply EAB for UEs configured for EAB and registered neither in the PLMN listed as most preferred PLMN of the country where the UE is roaming in the operator-defined PLMN selector list on the SIM/USIM, nor in their HPLMN nor in an PLMN that is equivalent to it). FIG. 12 illustrates an IE definition for an overload action IE.

The OVERLOAD STOP 364 process illustrated in FIG. 11 can also apply after an overload situation has ended and the transmission station does not receive the mobile device's EAB configuration information as part of the RRC connection request message.

The UMTS can provide an access barring overload mechanism for EAB between the transmission station, including the RNC, of the RAN and the core network (CN) via a Iu-PS interface. In an example, an existing Priority Class Indicator can be used to define EAB. The Priority Class Indicator information element (IE) can indicate that an overload has occurred and traffic for the indicated priority class can be reduced.

The Priority Class Indicator IE can have an IE/group name (Priority Class Indicator), a presence, a range, an IE type and reference, and a semantics description. The presence for the Priority Class Indicator IE can include mandatory (M). The IE type and reference for the Overload Action IE can include bit string of size 8 bits. The semantics description for the Priority Class Indicator IE can include: "Each bit can represent a priority class, as specified below. If a bit is set to "1", the signaling traffic of the respective priority class can be reduced. Bit (0)=Delay Tolerant traffic limited. Bit (1)=Limit traffic from UEs configured for EAB. Bit (2)=Limit traffic from UEs configured for EAB and registered neither in their HPLMN nor in a PLMN that is equivalent to it. Bit (3)=Limit traffic from UEs configured for EAB and registered neither in the PLMN listed as most preferred PLMN of the country where the UE is roaming in the operator-defined PLMN selector list on the SIM/USIM, nor in their HPLMN nor in an PLMN that is equivalent to it. Bits (4 . . . 7) reserved for future use."

In another example, the RNC in the transmission station can receive a priority class indicator IE from the core network. The priority class indicator IE can define the mobile device's roaming category used for configuring the SIB with EAB configuration information.

Figure 13:
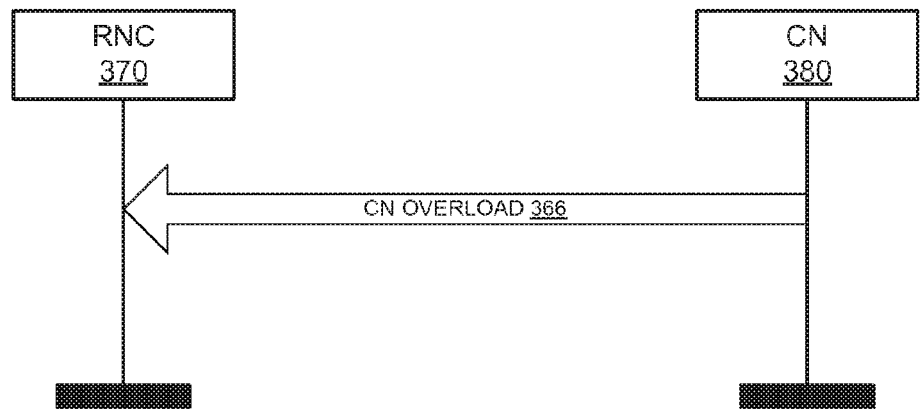
FIG. 13 illustrates a block diagram of an overload process from a core network (CN) to a radio network controller (RNC) in a universal mobile telecommunications system (UMTS) in accordance with an example.

In an example, a dedicated (or new) EAB Indicator can be used to define EAB. FIG. 13 illustrates a CN OVERLOAD 366 process at a CN 380 from a CN to a RNC 370 in a UMTS. The CN can indicate to the RNC that the CN is in a congested state by sending the CN OVERLOAD message. A CN Domain Indicator IE may be included, if the CN can determine the domain suffering from a signaling traffic overload. A specific CN node can send the CN OVERLOAD message towards those RNCs from which the CN can receive an INITIAL UE MESSAGE message.

Reception of the CN OVERLOAD message by the UTRAN can cause reduction of signaling traffic towards the CN. If the CN Domain Indicator IE is included in the CN OVERLOAD message, and a Global CN-ID IE is not included in the CN OVERLOAD message, the RNC can apply signaling traffic reduction mechanisms toward an indicated domain. If the Priority Class Indicator IE is included then the RNC can take action to reduce the traffic for the priority class indicated in the Priority Class Indicator IE. If the EAB Indicator IE is included then the RNC can take action to reduce the traffic for UEs configured for EAB and for subcategories of UEs indicated in the EAB Indicator IE.

Figure 14:
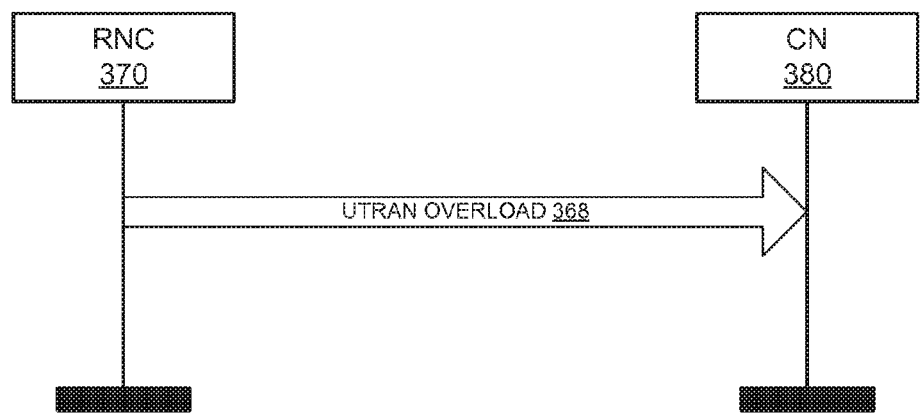
FIG. 14 illustrates a block diagram of an overload process from a radio network controller (RNC) to a core network (CN) in a universal mobile telecommunications system (UMTS) in accordance with an example.

FIG. 14 illustrates an UNTRAN OVERLOAD 368 process at the UTRAN from the RNC 370 to the CN 380 in the UMTS. If the UTRAN is not capable of sending signaling messages to UEs due to overloaded resources, the UTRAN can send an UTRAN OVERLOAD message to the CN. The RNC can include the Global RNC-ID IE in the UTRAN OVERLOAD message. The UTRAN OVERLOAD message can be sent towards CN nodes towards which the RNC can send the INITIAL UE MESSAGE message. If the Priority Class Indicator IE is included, the Priority Class Indicator IE can be ignored. If the EAB Indicator IE is included, the EAB Indicator IE can be ignored.

The EAB Indicator information element (IE) can indicate that an overload has occurred and traffic for the indicated extended access class can be reduced. The Extended Access Barring Indicator IE can have an IE/group name (EAB Indicator), a presence, a range, an IE type and reference, and a semantics description. The presence for the EAB Indicator IE can include mandatory (M). The IE type and reference for the EAB Indicator IE can include bit string of size 8 bits. The semantics description for the EAB Indicator IE can include: "Each bit can represent a priority class, as specified below. If a bit is set to "1", the signaling traffic of the respective priority class can be reduced. Bit (0)=Limit traffic from UEs configured for EAB. Bit (1)=Limit traffic from UEs configured for EAB and registered neither in their HPLMN nor in a PLMN that is equivalent to it. Bit (2)=Limit traffic from UEs configured for EAB and registered neither in the PLMN listed as most preferred PLMN of the country where the UE is roaming in the operator-defined PLMN selector list on the SIM/USIM, nor in their HPLMN nor in an PLMN that is equivalent to it. Bits (3 . . . 7) reserved for future use." FIG. 15 illustrates a radio access network application part (RANAP) protocol extension including an extended access barring (EAB) indicator.

In another example, the RNC in the transmission station can receive an EAB indicator IE from the core network. The EAB indicator IE can define the mobile device's roaming category used for configuring the SIB with EAB configuration information.

The described processes, procedures, and signaling mechanisms to configure EAB for the LTE and UMTS network can efficiently bar the access of certain categories of mobile devices for overload protection and control. Described processes and mechanisms can define the type and amount of EAB information broadcast in an existing SIB or a dedicated SIB for EAB. A broadcast of a dedicated SIB for EAB can provide dynamic update of EAB configuration information. A mobile station can receive dynamically an indication of a presence of EAB information in a serving network.

Figure 16:
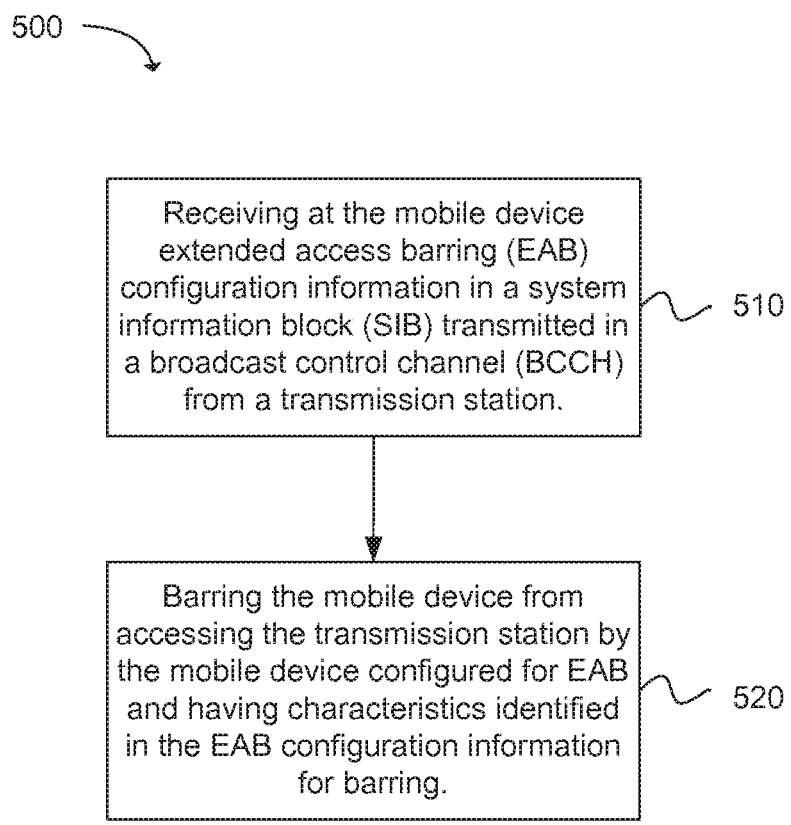
FIG. 16 depicts a flow chart of a method for authorizing access to a transmission station for a mobile device in accordance with an example.

Another example provides a method 500 for authorizing access to a transmission station for a mobile device, as shown in the flow chart in FIG. 16. The method includes the operation of receiving at the mobile device extended access barring (EAB) configuration information in a system information block (SIB) transmitted in a broadcast control channel (BCCH) from a transmission station, as in block 510. The operation of barring the mobile device from accessing the transmission station by the mobile device configured for EAB and having characteristics identified in the EAB configuration information for barring follows, as in block 520.

Figure 17:
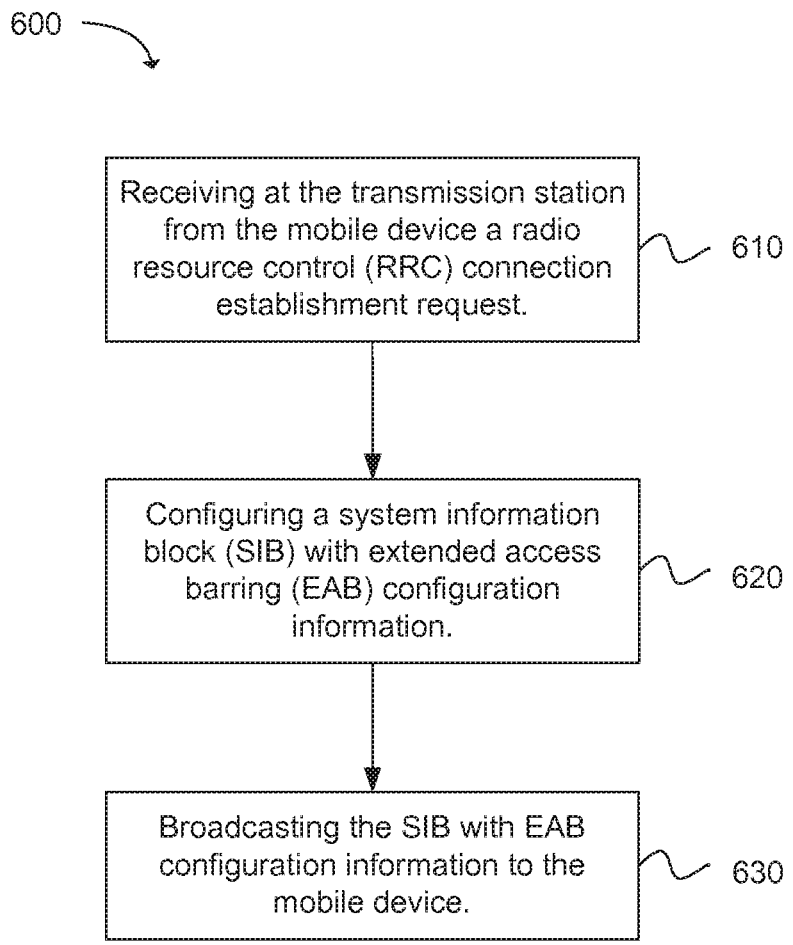
FIG. 17 depicts a flow chart of a method for barring a mobile device from accessing a transmission station in accordance with an example.

Another example provides a method 600 for barring a mobile device from accessing a transmission station, as shown in the flow chart in FIG. 17. The method includes the operation of receiving at the transmission station from the mobile device a radio resource control (RRC) connection establishment request, as in block 610. The operation of configuring a system information block (SIB) with extended access barring (EAB) configuration information follows, as in block 620. The next operation of the method can be broadcasting the SIB with EAB configuration information to the mobile device, as in block 630.

Figure 18:
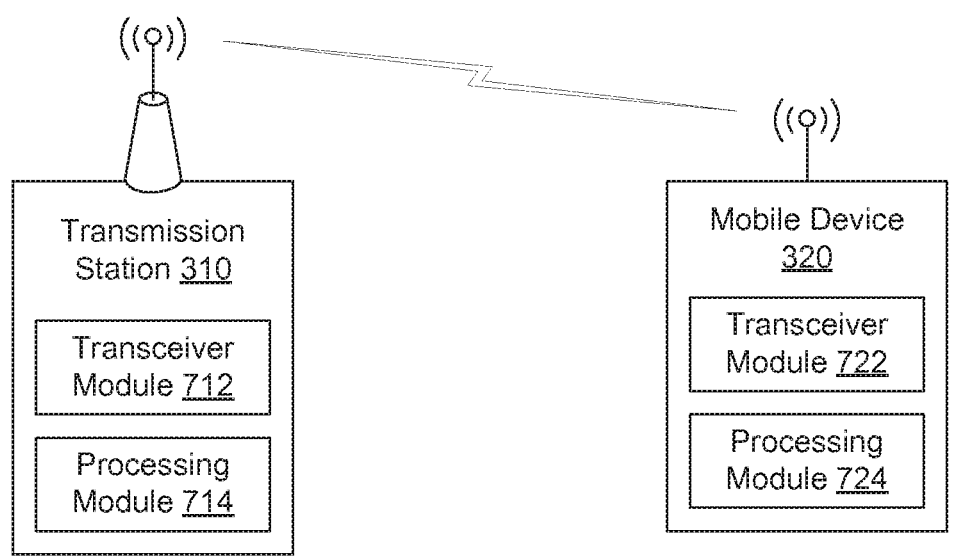
FIG. 18 illustrates a block diagram of a transmission station and a mobile device in accordance with an example.

FIG. 18 illustrates an example transmission station 310 and an example mobile device 320 configured for extended access barring. The transmission station can include a transceiver module 712 and a processing module 714. The transceiver module of the transmission station can receive from the mobile device a radio resource control (RRC) connection establishment request and broadcast a system information block (SIB) with extended access barring (EAB) configuration information to the mobile device. The processing module of the transmission station can configure the SIB with EAB configuration information. In addition, the transceiver module and the processing module of the transmission station can be configured to provide the functionality for EAB related to the transmission station as previously described. The mobile device can include a processing module 724 and a transceiver module 722. The transceiver module of the mobile device can receive EAB configuration information from a transmission station. The processing module of the mobile device can bar transmissions to the transmission station for the mobile device having characteristics identified in the EAB configuration information for barring. In addition, the transceiver module and the processing module of the mobile device can be configured to provide the functionality for EAB related to the mobile device as previously described.

Figure 19:
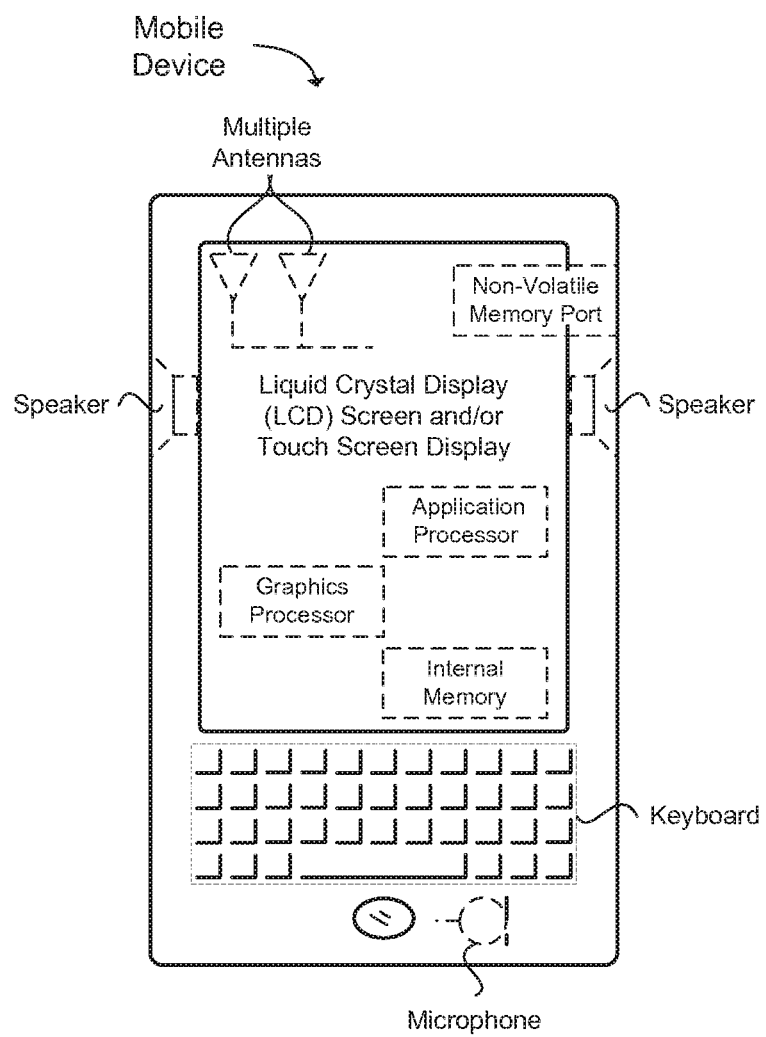
FIG. 19 illustrates a diagram of a mobile device in accordance with an example.

In another example, a transmission station can be in wireless communication with a mobile device. FIG. 19 provides an example illustration of the mobile device, such as a user equipment (UE), a mobile station (MS), a mobile wireless device, a mobile communication device, a tablet, a handset, or other type of mobile wireless device. The mobile device can include one or more antennas configured to communicate with transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, 3GPP UMTS, GSM, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 19 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) configured for extended access barring (EAB), comprising:
 a transceiver module configured to receive EAB configuration information in a system information block (SIB) from a node, wherein the SIB is a SIB type 14 in a long term evolution (LTE) system or the SIB is a SIB type 21 in a universal mobile telecommunications system (UMTS); and
 a processing module configured to bar transmissions to the node for the UE configured for EAB when the SIB has characteristics identified in the EAB configuration information for barring.

2. The UE of claim 1, wherein the transceiver module is further configured to receive periodically a system information block (SIB) type 1 in a long term evolution (LTE) system and a master information block (MIB) in a universal mobile telecommunications system (UMTS), and receive a dedicated SIB for EAB associated with the SIB type 1 in the LTE system or a dedicated SIB for EAB associated with the MIB in the UMTS; and the processing module is further configured to update the EAB configuration information periodically.

3. The UE of claim 1, wherein the transceiver module is further configured to receive a system information block (SIB) type 1 in a long term evolution (LTE) system and a master information block (MIB) in a universal mobile telecommunications system (UMTS) and receive a dedicated SIB for EAB associated with the SIB type 1 in the LTE system and a dedicated SIB for EAB associated with the MIB in the UMTS prior to a request for a radio resource control (RRC) connection establishment for delay tolerant access with the node; and the processing module is further configured to update the EAB configuration information prior to the request for the RRC connection establishment.

4. The UE of claim 1, wherein the transceiver module is further configured to receive a paging message with an EAB indication and receive a dedicated system information block (SIB) for EAB associated with the EAB indication in a long term evolution (LTE) system and a dedicated SIB for EAB associated with the EAB indication in a universal mobile telecommunications system (UMTS) prior to a request for a radio resource control (RRC) connection establishment for delay tolerant access with the node; and the processing module is further configured to update the EAB configuration information prior to the request for the RRC connection establishment.

5. The UE of claim 1, wherein the transceiver module is further configured to receive a paging message with an EAB indication prior to a request for a radio resource control (RRC) connection establishment for delay tolerant access with the node, wherein the EAB indication includes barring category information; and the processing module is further configured to update the EAB configuration information prior to the request for the RRC connection establishment.

6. The UE of claim 1, wherein the transceiver module is further configured to send to the node a radio resource control (RRC) connection establishment request including an EAB classification for the UE configured for EAB, wherein the EAB classification defines the UE's roaming category.

7. The UE of claim 1, wherein the UE is configured to connect to at least one of a wireless local area network (WLAN), a wireless personal area network (WPAN), and a wireless wide area network (WWAN), and the UE includes an antenna, a touch sensitive display screen, a speaker, a microphone, a graphics processor, an application processor, internal memory, or a non-volatile memory port.

8. A node configured for extended access barring (EAB), comprising:
a transceiver module configured to receive from a user equipment (UE) a radio resource control (RRC) connection establishment request and broadcast a system information block (SIB) with extended access barring (EAB) configuration information to the UE, wherein the SIB is a SIB type 14 in a long term evolution (LTE) system or the SIB is a SIB type 21 in a universal mobile telecommunications system (UMTS); and
a processing module configured to configure the SIB with EAB configuration information.

9. The node of claim 8, wherein the RRC connection establishment request includes an EAB classification for the UE configured for EAB, the transceiver module is further configured to send to the UE a RRC connection establishment rejection message for the UE configured for EAB and having the EAB classification defined for EAB in the EAB configuration information for the node, wherein the EAB classification defines the UE's roaming category.

10. The node of claim 8, wherein the transceiver module is further configured to receive a priority class indicator information element (IE) or an EAB indicator IE from a core network, wherein the priority class indicator IE defines the UE's roaming category used for configuring the SIB with EAB configuration information, and the EAB indicator IE defines the UE's roaming category used for configuring the SIB with EAB configuration information.

11. The node of claim 8, wherein the node includes a base station (BS), a Node B (NB), an evolved Node B (eNB), a base band unit (BBU), a remote radio head (RRH), a remote radio equipment (RRE), a relay station (RS), a radio equipment (RE), or other type of wireless wide area network (WWAN) access point.

* * * * *